United States Patent [19]

Bailey et al.

[11] 3,899,874

[45] Aug. 19, 1975

[54] TURBINE ENGINE

[76] Inventors: Henry E. Bailey, P.O. Box 350, Walnut Creek, Calif. 94579; Dennis H. Bailey; Richard E. Bailey, both of P.O. Box AL, Clearlake Highlands, Calif. 95422

[22] Filed: Sept. 11, 1974

[21] Appl. No.: 505,053

[52] U.S. Cl. .............. 60/39.34; 60/39.44; 60/39.78
[51] Int. Cl.² ........................................... F02C 5/04
[58] Field of Search ............ 60/39.34, 39.44, 39.78; 415/92

[56] References Cited

UNITED STATES PATENTS

| | | | |
|---|---|---|---|
| 1,132,742 | 3/1915 | Smiddy | 60/39.44 X |
| 1,301,871 | 4/1919 | Pauly et al. | 60/39.78 X |
| 1,403,103 | 1/1922 | Petrie | 60/39.44 UX |
| 3,225,539 | 12/1965 | Coverston | 60/39.44 X |

FOREIGN PATENTS OR APPLICATIONS

| | | | |
|---|---|---|---|
| 899,666 | 8/1944 | France | 60/39.44 |
| 959,144 | 9/1949 | France | 60/39.44 |

Primary Examiner—C. J. Husar
Assistant Examiner—Michael Koczo, Jr.
Attorney, Agent, or Firm—Flehr, Hohbach, Test, Albritton & Herbert

[57] ABSTRACT

A turbine engine of simplified, single shaft construction which runs on an open-cycle mode of operation. The engine includes a centrifugal air compressor mounted for rotation with a turbine rotor on a single shaft within a housing. Air is compressed and preheated within a chamber concentric with the rotor. The outer periphery of the turbine rotor is formed with a series of recesses which define alternate combustible charge and air chambers. A passage is provided in the housing to direct air from the compression chamber into the charge and air chambers of the rotor. Movement of the rotor carries the compressed air/fuel within the charge chamber into register with a spark plug which ignites the charge which combusts in an elongate expansion chamber formed about the rim of the engine. Movement of successive air chambers into the region of the expansion chamber releases compressed air for diluting the combustion gases released from the immediately preceeding charge chamber. A passageway is provided to inject air from the compression chamber at a mid-point along the expansion chamber to further dilute the combustion gases with excess air for insuring complete combustion with a minimum of harmful exhaust emissions. An exhaust outlet is provided at the end of the expansion chamber, and exhaust scavenging by compressed air is achieved by a passage directing air from the compression chamber into the exhaust outlet.

8 Claims, 6 Drawing Figures

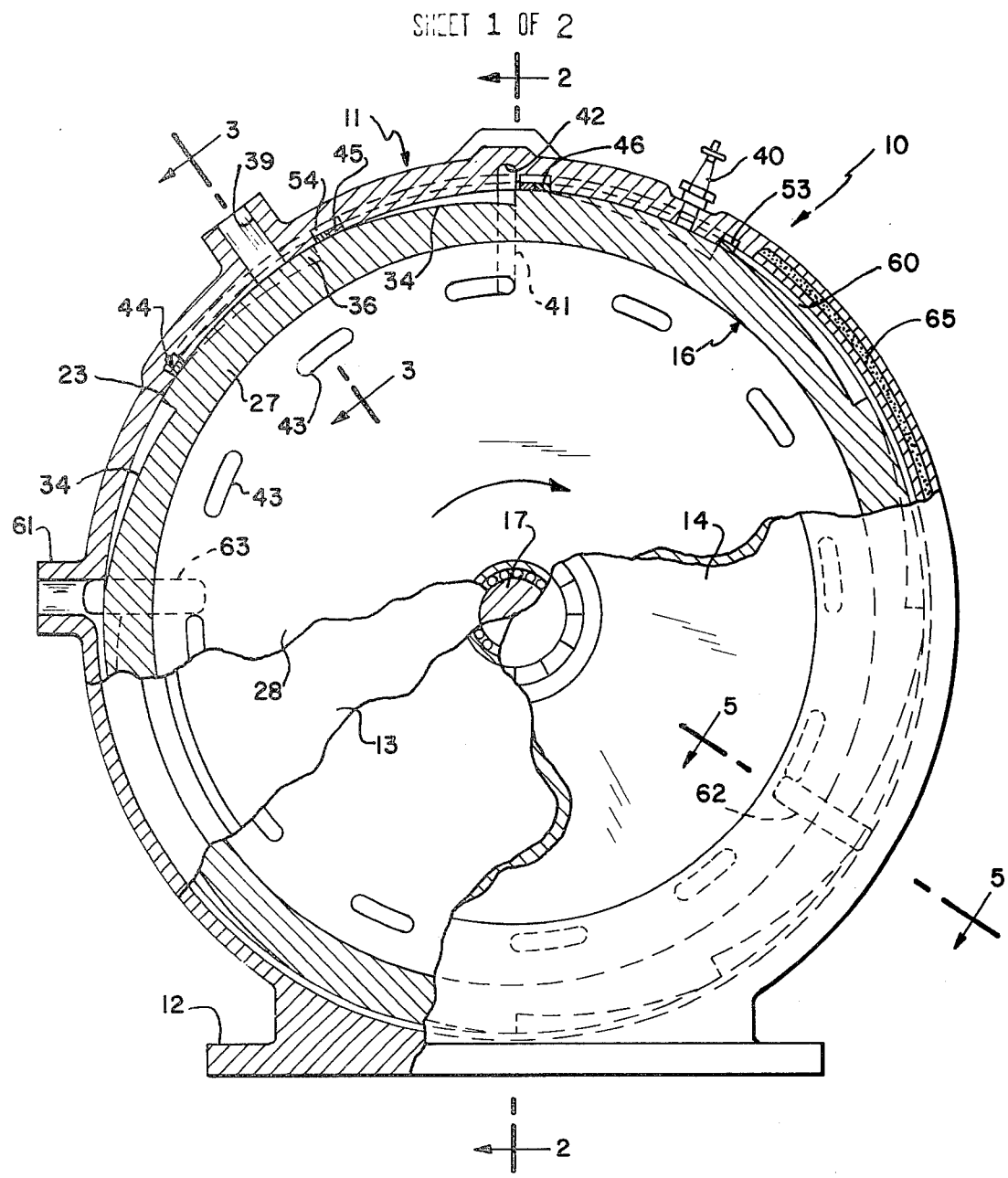
FIG.—1
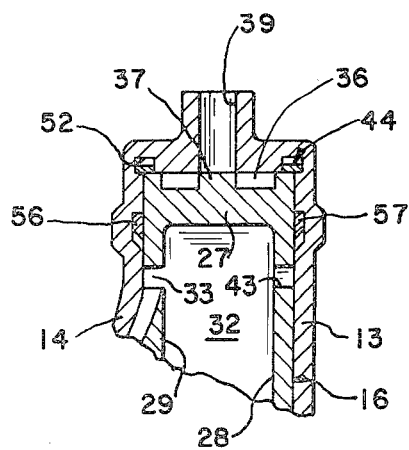
FIG.—3
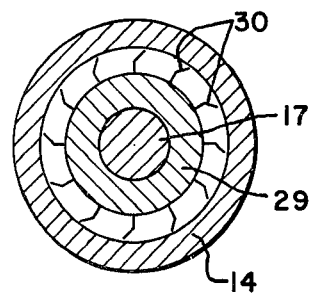
FIG.—4

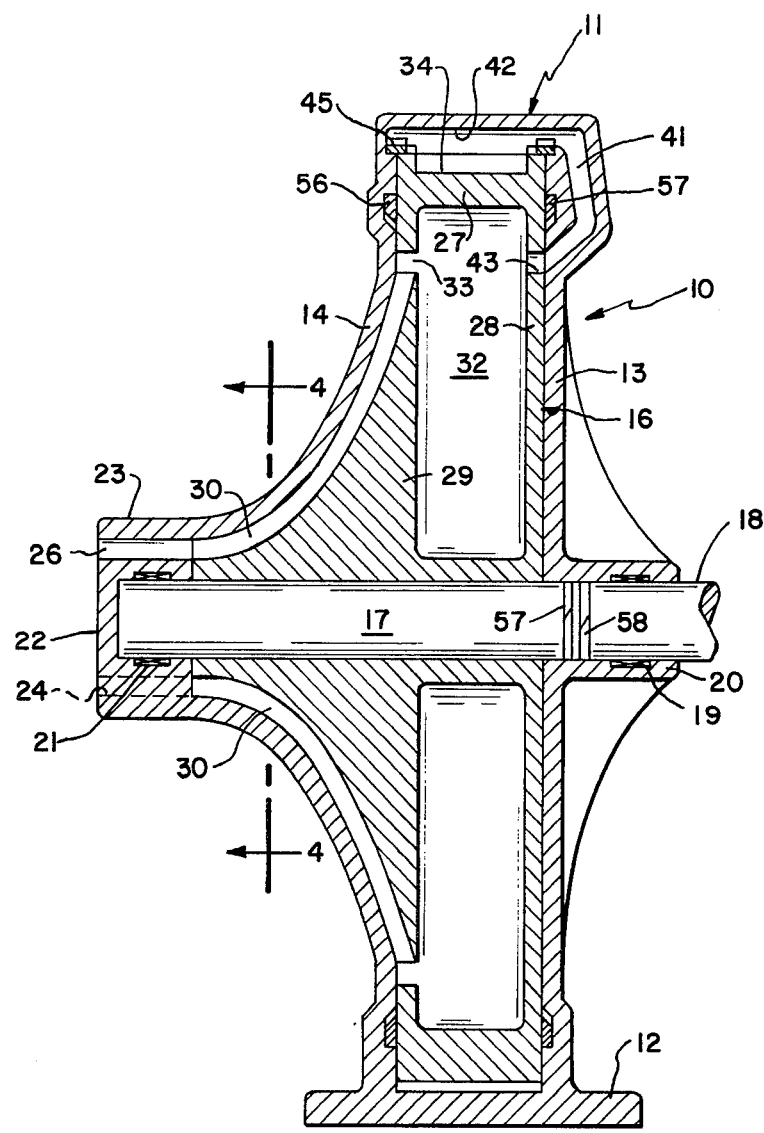
FIG.—2
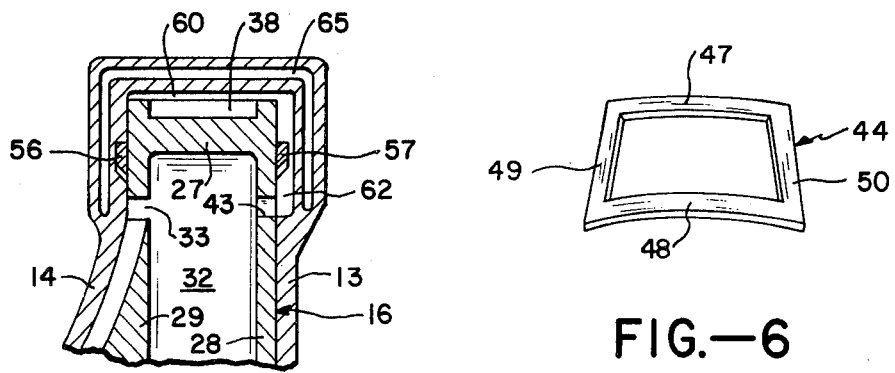
FIG.—5
FIG.—6

TURBINE ENGINE

BACKGROUND OF THE INVENTION

This invention relates to turbine engines, and in particular relates to turbine engines in which the fuel undergoes constant volume combustion with complete expansion.

Conventional turbine engines operate under a combustion process in which combustion occurs at constant pressure. It has been recognized that the most efficient combustion process is a constant volume combustion process, such as the Atkinson piston engine process which was proposed in 1885. The constant volume combustion process was adapted to a turbine engine by Holzwarth in 1908. The Holzwarth explosion process employed a combustion chamber which was opened and closed by a valve arrangement with exhaust gases from the chamber acting through a nozzle against turbine blades to produce useful work. However, the filling of the chamber and changing velocity of the nozzle stream introduced inherent losses which prevented development of the Holzwarth process.

Recent governmental legislation has required manufacturers of mobile equipment powered by gasoline fueled internal combustion engines to reduce harmful exhaust by means such as external emission control devices, engine modification or other methods. However, these objectives have heretofore not been fully realized. Furthermore, the energy shortage problem has led to a search for internal combustion engines with better fuel economy. It would be desirable to fulfill these requirements through an engine which would be capable of operating under the constant volume combustion process.

OBJECTS AND SUMMARY OF THE INVENTION

It is a general object of the invention to provide an improved turbine engine which will achieve complete expansion with constant volume combustion.

Another object is to provide an engine of the type described which will operate with reduced amounts of harmful exhaust emissions.

Another object is to provide an engine of the type described which will operate with more efficient fuel utilization.

Another object is to provide an engine of the type described which has greater flexibility of control for a wider range of engine applications, such as in automobiles and other mobile equipment.

Another object is to provide an engine of the type described which is of simplified construction with only one moving part, which operates with a minimum of friction, and which has a relatively high power-to-weight ratio.

The turbine engine of the invention includes a rotor which is mounted on a shaft for rotation within a circular housing. A plurality of circumferencially spaced recesses are formed about the outer periphery of the rotor. The recesses define combustion charge chambers which alternate with air chambers. An expansion chamber is formed about a portion of the housing in register with the path of movement of the recesses. A centrifugal air compressor is mounted on the shaft for directing air under pressure into a compression chamber formed co-axially within the rotor, which also serves as a heat recuperator. An end wall of the rotor is formed with a series of slots through which compressed air is directed into passages which are formed in the housing. An inlet port in the housing directs a combustible air/fuel charge into the charge chambers, a rib which is formed in the air chambers registers with the inlet port to preclude entry of the combustible charge into the air chambers. Compressed air from a first one of the passages is directed into the charge and air chambers upstream of a spark plug. Ignition of the compressed charge by the spark plug causes the charge to undergo constant volume combustion in the charge chambers and thereafter imparting torque to the rotor as the gases are discharged from the channel through an exhaust outlet. A second one of the passages in the housing directs compressed air into a mid-portion of the expansion channel for diluting the gases with oxygen for more complete combustion, while a third of the passages directs air through the exhaust outlet for scavenging spent gases from the chambers.

The foregoing and additional objects and features of the invention will become apparent from the following description in which the preferred embodiments have been set forth in detail in conjunction with the accompanying drawings.

BRIEF DESCRIPTION OF THE DRAWINGS

FIG. 1 is a cross-sectional view, partially broken away, of a turbine engine incorporating the invention;

FIG. 2 is an axial section view taken along the line 2—2 of FIG. 1;

FIG. 3 is a fragmentary sectional view taken along the line 3—3 of FIG. 1;

FIG. 4 is a cross-sectional view taken along the line 4—4 of FIG. 2;

FIG. 5 is a fragmentary sectional view taken along the line 5—5 of FIG. 1; and

FIG. 6 is a perspective view of a sealing element used with the turbine engine of FIG. 1.

DESCRIPTION OF THE PREFERRED EMBODIMENTS

In the drawings FIGS. 1 and 2 illustrates generally at 10 a turbine engine constructed in accordance with the invention. Engine 10 includes a housing 11 of circular configuration mounted on a base 12. The housing is closed at opposite ends by a flat end wall 13 and a conical wall 14. A rotor 16 is mounted on a shaft 17 for rotation within the housing. The power end 18 of the shaft is rotatably supported by a bearing assembly 19 within a support 20 collar while the opposite end of the shaft is supported by a bearing assembly 21 within a collar 22. The collar 22 is radially spaced from circular housing end 23 by ribs 24 to define an annular air inlet opening 26. Power end 18 of the shaft may be coupled to the desired end use application through a suitable reduction gear train, not shown.

Rotor 16 is formed with an outer peripherial rim 27, a circular end wall 28, and an axially spaced necked-down conical wall 29 which supports a plurality of impeller blades 30, as illustrated in FIG. 4. The impeller blades are adapted to turn with the rotor in close-spaced relationship with housing wall 14 to act as a centrifugal air compressor.

The annular volume within the rotor between rim 27, end wall 28 and conical wall 29 defines a compression chamber 32. Inlet air which flows through the annular opening 26 is pumped by impeller blades 30 into the compression chamber through the annular gap 33 between the outer rim of conical wall 29 and rotor rim 27. The impeller blades operate as a centrifugal compressor directly driven from rotor 16.

A plurality, illustrated as 12, of triangular shaped recesses 34 are formed at equal circumferencially spaced positions about rotor rim 27. Alternate ones of the recesses comprise six air transfer chambers 36, with each air chamber being formed with a circumferencially extending rib 37, as illustrated in FIG. 3. The six remaining recesses which are positioned between the air chambers comprise combustion charge chambers 38, as illustrated in FIG. 5.

An inlet port 39 is formed in the outer rim of the housing in register with the path of movement of the rotor. The inlet port is connected through an inlet manifold, not shown, with a suitable carburetor which forms an atomized air/fuel mixture as the combustible charge. As illustrated in FIG. 3 the axial width of each rib 37 is equal to the diameter of the inlet port so that inlet flow is blocked through the port when each air chamber 36 moves into register with that port. Because of the absence of ribs in charge chambers 38, the air/fuel mixture is free to flow into these chambers.

As best illustrated in FIG. 2 an air passage 41 is formed in the outer margin of housing wall 13 at a position downstream of inlet port 39. The upper end of passage 41 communicates with a channel 42 formed across the rim of the housing. A plurality of circumferencially spaced slots 43 are formed in the end wall of rotor to move in register with the lower end of passage 41. The slots are positioned to register with this passage in timed relationship with movement of a corresponding air or charge chamber beneath channel 42 so as to establish communication of air from compression chamber 32 through the passage and into the air or charge chambers. The compressed air fills the air chambers with a volume of fresh air, and compresses the air/fuel mixture in each charge chamber.

A spark plug 40 is mounted in the outer rim of housing 11 downstream of air passage 41 and in register with the path of movement of the air and charge chambers. Suitable voltage distributor means, not shown, is provided for energizing the spark plug in timed relationship with movement of rotor 16 for igniting the air/fuel mixture within each charge chamber.

Three identical sealing elements 44, 45 and 46 are provided for sealing the respective charge inlet, air inlet and spark combustion zones of the engine. Seal element 44 for the charge inlet zone, shown in perspective in FIG. 6, is typical of the three elements and comprises a flat, rectangular seal of metal composition having four sides 47–50 forming a rectangular opening. The axial width of the opening between the curved sides 47 and 48 is commensurate with the width of the rotor rim with sufficient overlap on each edge, as illustrated in FIG. 3, for precluding escape of gases through the interface between the rotor and housing. The peripherial length between the sides 49 and 50 of element 44 is commensurate with the length of the rotor recesses forming the air and charge chambers. As illustrated in FIG. 3 the sealing element 44 is mounted in a rectangular seat 52 formed about inlet port 39 so as to encircle the outer dimension of air chamber 36 which is illustrated as having moved into register with the inlet port. Sealing element 46 is mounted within a rectangular seat 53 formed in the housing at the combustion zone about spark plug 40, and the intermediate sealing element 45 is mounted in the rectangular seat 54 about the air inlet zone of air channel 42. The depths of the seats for the three sealing elements is approximately twice the thickness of the elements so that the unoccupied space in the seats permits entry of pressurized gases to act against the elements and form a tight seal.

The flat outer side margins of rotor walls 28 and 29 are sealed by a pair of circular split ring seals 56, 57 which are mounted in circular grooves formed in the end walls of housing 11. The split rings are of a relatively large diameter and are closely positioned from the outer margins of the rotor side walls. These rings expand under spring tension and gas pressure for preventing blow-by of gases from around the sides of the rotor rim. A pair of split rings 57, 58 are mounted in grooves formed about shaft 17 at a position immediately outside of the juncture between housing wall 13 and rotor wall 28. The split rings also expand under spring tension and gas pressure to form seals which prevent blow-by of pressurized air from the compression chamber through the interface between the rotor and housing.

An expansion channel 60 is formed within the housing wall 13 downstream of the spark plug. As illustrated in FIG. 5 expansion channel 60 has an axial width commensurate with the width of the rotor. The length of the expansion channel extends around a substantial portion of the circumference of the rotor where it terminates at an exhaust outlet 61 formed through the housing. Preferably the expansion channel extends through an arc of greater than 180° to provide for complete expansion and combustion of gases. A layer of insulating material 65 is contained with a jacket covering the expansion channel for retaining and conserving heat from the combustion process.

A second air passage 62 is formed in housing wall 13 mid-way along the length of expansion channel 60. As shown in FIG. 5 the inner end of passage 62 is positioned in register with the path of movement of rotor slots 43, and the outer end of the passage communicates with the expansion channel. When each of the rotor slots moves into register with second passage 62 air under pressure from compression chamber 32 is directed into the expansion channel where it dilutes and cools the combusting gases.

A third air passage 63 is formed in housing wall 13 adjacent exhaust outlet 61. The radial inner end of passage 63 is in register with the path of movement of rotor slots 43, and the outer end of the passage communicates with the exhaust outlet, as illustrated in FIG. 1. As each rotor slot turns into register with passage 63 compressed air from chamber 32 is directed into the exhaust outlet for scavenging spent gases from the air and charge chambers, and also to assist in cooling the surfaces of these chambers.

In operation, rotor 16 is brought up to self-sustained operating speed by turning shaft 17 clockwise, as viewed in FIG. 1, from a suitable prime mover, such as an electric starter motor, not shown. High speed rotation of impeller blades 30 turning with the rotor draws in air through inlet 26 and discharges it under pressure through opening 33 into compression chamber 32.

A suitable hydrocarbon fuel such as gasoline is atomized with air in the carburetor to form a rich air/fuel mixture or combustible charge which is directed through inlet port 39 into each of the charge chambers 38 as they successively pass into register with this port.

As the air chambers 36 move into register with the inlet port entry of the combustible charge is blocked due to the ribs 37. Continued clockwise rotation of the rotor carries the combustible charge in each chamber 38 into the zone of first air passage 41. At the same time a corresponding rotor slot 43 moves into register with the inner end of passage 41 so that compressed air from chamber 32 is directed through this passage into channel 42 and the associated charge chamber. This injection of air serves to compress the combustible charge within the charge chamber to the required compression ratio, and at the same time the rich air/fuel mixture in the chamber is diluted into a leaner mixture. The air chambers 36 which follow each charge chamber into the zone of the first air passage also receive an injection of compressed air as the associated rotor slot moves into register with this passage.

Continued rotation of rotor 16 carries each charge chamber into the zone of spark plug 40 which is energized by the voltage distributor operating in timed relationship with rotation of the rotor. The spark plug ignites the combustible charge and, as the leading edge of the charge chamber emerges into expansion channel 60, the burning gases expand and escape into this channel imparting a driving torque against the leading face of the charge chamber. Immediately following this, air chamber 36 emerges into the expansion channel thereby releasing its volume of compressed air into the burning gases at the beginning of their expansion phase. This injection of air operates in the manner of a stratified charge engine in that the injected air increases the air/fuel ratio above stoichiometric immediately after combustion commences, with the result that CO and HC constituents formed in the products of combustion are oxidized. With the burning of the relatively high air/fuel ratio gases the effect of low flame temperature resulting from the heating of excess air that has not entered into the combustion reaction predominates over oxidation of $N_2$, which would otherwise develope, and therefore $N_x$ constituents formed in the products of combustion are reduced.

Additional compressed air is injected into the expansion process as the rotor slots move into register with second passage 62. This additional injection of air assures oxidation of harmful exhaust components, and at the same time the temperature of the products of combustion is reduced to a safe value. It will be realized that air injection in the expansion process is possible in the present turbine engine design while, on the other hand, it could not be achieved in conventional internal combustion engines where extremely high air/fuel ratios required for controlling exhaust emissions would result in operating problems such as misfire and stalling.

The spent gases from the expansion phase exhaust through outlet 61, which may be coupled through a suitable muffler and exhaust pipe, not shown. As rotor slots 43 move into register with third passage 63 compressed air from compression chamber 32 is directed through this passage for scavenging the chambers 36 and 38 of waste gases.

It will be realized that the combustion process in the invention is a constant volume combustion which developes a higher thermal efficiency than the constant pressure combustion process used in conventional gas turbine engines. The combustion process of the invention may be visualized as a steady "peel-off" of expansion from combustion of the charge at a rate which allows complete expansion of the products of combustion, which produces oxidation of harmful CO and HO, which reforms harmful NO into $NO_2$ and $O_2$, and which assures temperature reduction within the expansion channel. The energy released by the burning fuel is fully utilized. For example the ingestion of atmospheric air into the compression chamber serves to cool the engine and in so doing makes a recuperator of the compression chamber which recovers energy from expanding gases by heat transfer back to the combustion process.

The engine of the invention has wide flexibility of size and configuration, depending upon the desired torque and power requirement. The design variables include a variation in the number, shape and size of the charge and air chambers, a variation in the air compression ratio and air/fuel ratio, and the size of the expansion channel. For example, an engine may be constructed in accordance with the invention in which the centrifugal compressor creates a compression ratio of 6:1. With the carburetor supplying a combustible charge having an air/fuel ratio of 1½:1, the combination with compressed air in the charge chamber would result in an air/fuel ratio of 14:1, which approximates the stoichiometric ratio for a gasoline fuel. Following ignition of such a charge the subsequent injection of compressed air from a following air chamber, which is half the volume of the charge chamber, would increase the theoretical air/fuel ratio to 21.5:1, which supplies sufficient excess oxygen for controlling CO, HC and $N_x$ emissions.

While the foregoing embodiments are at present considered to be preferred it is understood that numerous variations and modifications may be made therein by those skilled in the art. For example, while injection of compressed air into the charge chambers for compressing the air/fuel mixture is illustrated, this could also be accomplished by injecting the compressed air through the inlet port from a modified carburetor arrangement. Also, fuel could be injected directly into the charge chambers at time of compression. It is intended to cover in the appended claims all such variations and modifications as fall within the true spirit and scope of the invention.

We claim:

1. A turbine engine comprising the combination of a housing, a rotor mounted for rotation within the housing, said rotor being formed about its outer periphery with a plurality of circumferentially spaced recesses which define with the housing combustible charge chambers and air chambers with the charge chambers alternating with the air chambers, means forming a compression chamber within the rotor, air compression means driven by the rotor for directing air under pressure into the compression chamber, first passage means for communicating compressed air from the compression chamber to the recesses, inlet means for directing a combustible charge into the charge chambers, means for igniting the combustible charge in each charge chamber whereby the charge undergoes constant volume combustion in the charge chambers, means on the housing for sealing the charge chambers during combustion, means forming an expansion channel on the inner periphery of the housing extending from past the sealing means in the direction of rotation of the rotor so that upon communication of the charge chambers with the expansion channel, the combustion gases expand into the expansion channel and impinge on the surfaces of the rotor recesses to thereby impart torque to the rotor, and outlet means in the housing for exhausting spent gases from the expansion channel.

2. A turbine engine as in claim 1 in which the expansion channel extends from a combustion zone adjacent the ignition means about at least one half of the outer periphery of the rotor whereby substantially complete combustion and expansion of the gases is achieved in the expansion channel before the gases are exhausted through the outlet means.

3. A turbine engine as in claim 1 in which said air chambers are formed with circumferentially extending ribs, and said first passage means is positioned in register with the path of movement of the ribs whereby the latter preclude entry of the combustible charge into the air chambers as the latter move across the inlet means.

4. A turbine engine as in claim 1 which includes a shaft mounted concentric within the housing, said rotor is mounted for rotation on the shaft, and the air compression means comprises a centrifugal air compressor mounted for rotation on the shaft, the centrifugal compressor having an inlet at one end of the housing and a peripherial outlet in communication with the compression chamber.

5. A turbine engine as in claim 1 in which the compression chamber comprises an annular cavity formed within the rotor whereby the thermal energy conducted through the rotor from the heat of combustion within the surrounding expansion channel preheats air within the compression chamber.

6. A turbine engine as in claim 1 which includes second passage means for directing air from the compression chamber into the expansion channel downstream of the region of the ignition means, said air from the second passage means serving to dilute the combustion gases within the expansion channel.

7. A turbine engine as in claim 1 which includes third passage means for directing air from the compression chamber into the expansion channel in the region of the outlet means whereby air from the third passage means scavenges exhaust gases from alternate charge and air chambers, and from the expansion channel, through the outlet means.

8. A turbine engine as in claim 1 in which the rotor is formed with a circular end wall within the housing, said end wall being formed with a plurality of circumferencially spaced slots, and said first passage means is positioned in register with the path of movement of said slots to direct compressed air into the first passage means from the compression chamber.

* * * * *